United States Patent [19]
Adams et al.

[11] 3,937,130
[45] Feb. 10, 1976

[54] LOW FRICTION SEAL ASSEMBLY
[75] Inventors: Cecil E. Adams; Ellis H. Born, both of Columbus, Ohio
[73] Assignee: Abex Corporation, New York, N.Y.
[22] Filed: Nov. 4, 1974
[21] Appl. No.: 520,318

[52] U.S. Cl. .................. 92/125; 91/339; 91/506
[51] Int. Cl.² ..................... F01C 9/00; F01B 3/00
[58] Field of Search ................ 91/506, 339; 92/125

[56] References Cited
UNITED STATES PATENTS

| 3,207,048 | 9/1965 | Rumsey ............................... 92/125 |
| 3,277,796 | 10/1966 | Wessel et al. ......................... 92/125 |
| 3,375,756 | 4/1968 | Bienaime ............................. 92/125 |
| 3,426,654 | 2/1969 | Laughman ........................... 92/125 |

FOREIGN PATENTS OR APPLICATIONS

| 1,097,818 | 1/1961 | Germany ............................. 91/506 |

Primary Examiner—William L. Freeh
Assistant Examiner—G. P. LaPointe
Attorney, Agent, or Firm—Thomas S. Baker, Jr.; David A. Greenlee

[57] ABSTRACT

A low friction seal assembly for a fluid energy translating device seals a pair of pressure fluid chambers from one another. The assembly is mounted in a movable member of the device and has an elastic member which mechanically and hydraulically biases a seal member into engagement with the walls of the device.

8 Claims, 5 Drawing Figures

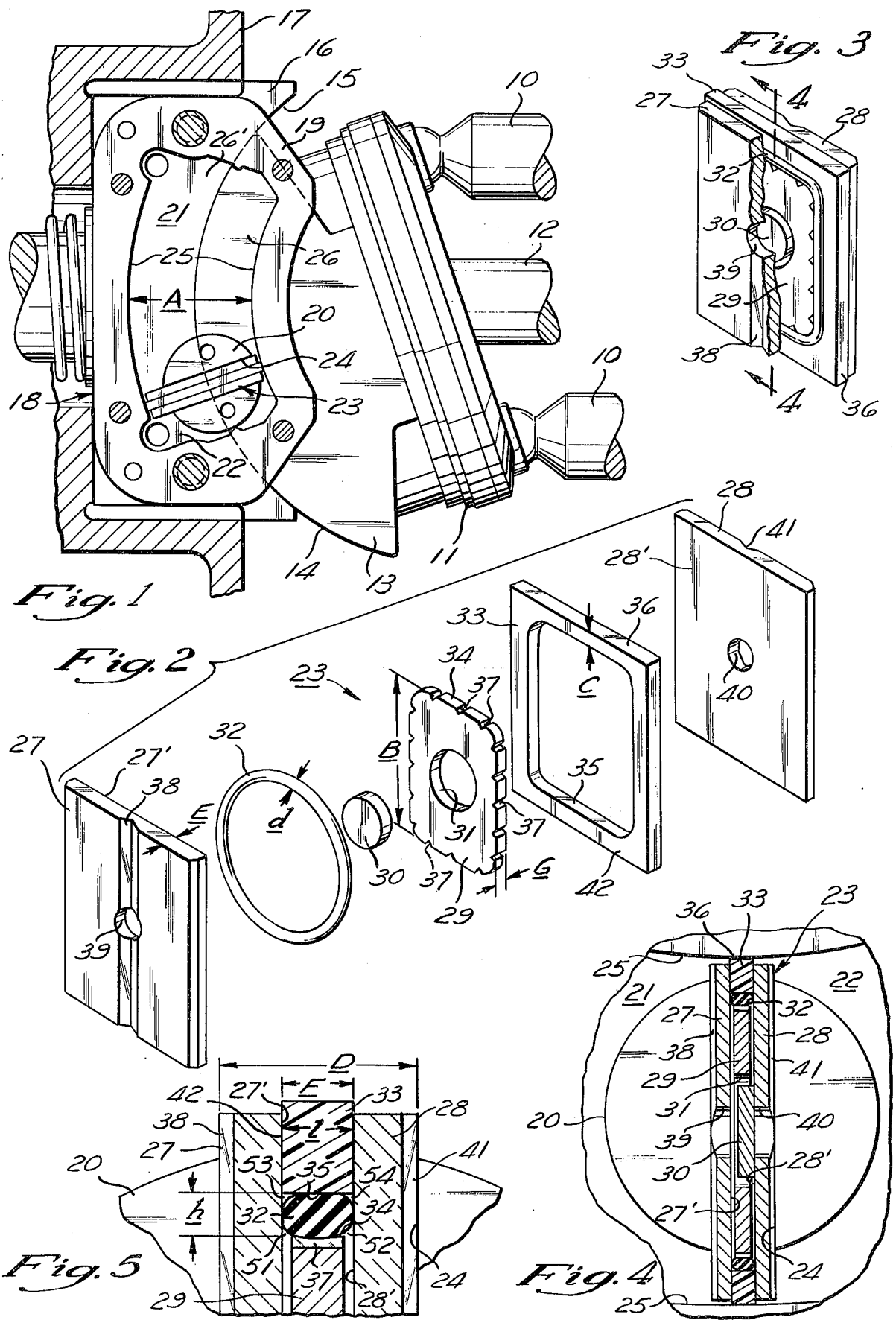

LOW FRICTION SEAL ASSEMBLY

BACKGROUND OF THE INVENTION

The instant invention relates to a low friction seal assembly which isolates one fluid chamber from another in a fluid energy translating device. The seal is biased outwardly into engagement with the walls of the device by hydraulic and mechanical means.

In a fluid energy translating device such as a hydraulic motor, a vane or piston seal must accommodate irregularities in the wall surfaces of the fluid chambers as the vane or piston is moved and must accommodate rapid changes of fluid pressure in the chambers with a minimum of wear.

SUMMARY OF THE INVENTION

The low friction seal assembly of the instant invention is supported in a vane and biased into engagement with the walls of a fluid motor to seal one fluid chamber from another. The seal assembly includes an O-ring which mechanically biases a seal member into contact with the fluid motor walls. Hydraulic fluid is supplied to the O-ring which is hydraulically balanced radially over a portion of its surface to reduce the force applied to the seal member and is hydraulically balanced laterally over a portion of its surface to reduce the force applied to the support and thereby permit the assembly to move easily in the support.

DESCRIPTION OF THE DRAWINGS

FIG. 1 is a sectional view of an axial piston pump having a fluid motor which incorporates the seal assembly of the instant invention.

FIG. 2 is an exploded view of the low friction vane seal assembly.

FIG. 3 is an assembled view of the vane seal assembly with half of a back-up plate removed.

FIG. 4 is a sectional view of the vane seal assembly supported in a fluid motor vane.

FIG. 5 is an enlarged sectional view of a portion of the vane seal assembly shown in FIG. 4.

DESCRIPTION OF THE PREFERRED EMBODIMENT

A portion of an axial piston pump is disclosed in FIG. 1 having a plurality of pistons 10 which slide over an angled thrust plate 11 and reciprocate when a drive shaft 12 is rotated. Plate 11 is mounted on a pivotable rocker cam 13 in a well known manner. Rocker cam 13 has a convex surface 14 which engages a mating surface 15 on a cam support 16. Cam support 16 is mounted in a housing 17 of the pump.

Rocker cam 13 is pivoted in support 16 by a fluid motor 18 to change the displacement of the pump. Motor 18 has a housing 19 rigidly mounted in pump housing 17 and a movable vane 20 which is rigidly affixed to rocker cam 13. Housing 19 is divided into a pair of fluid chambers 21, 22 by vane 20. Chambers 21, 22 are enclosed by walls 25 of housing 19, a surface 26 on rocker cam 13, a surface 26' on cam support 16 and by an end cover, not shown. A seal assembly 23 mounted in a slot 24 in vane 20 seals fluid chambers 21, 22 from one another.

Motor 18 is operated to pivot rocker cam 13 when high pressure fluid is supplied to one of the fluid chambers 21, 22 to move vane 20 and expand the chamber; simultaneously fluid is exhausted from the other fluid chamber 21, 22 as it is contracted. As vane 20 moves, vane seal assembly 23 engages the surfaces or walls 25, 26, 26' which define fluid chambers 21, 22 and prevents leakage of pressure fluid from one chamber 21, 22 to the other.

Seal assembly 23 will now be described in detail with reference to FIGS. 2-5. Seal assembly 23 includes a pair of back-up plates 27, 28, a spacer 29, a disc 30 which fits loosely in a bore 31 in spacer 29, an O-ring 32 and a flexible seal member 33. Seal assembly 23 is assembled by placing disc 30 in bore 31, mounting O-ring 32 on the perimeter 34 of spacer 29, squeezing mounted O-ring 32 into an opening in seal member 33 defined by a wall 35 and sandwiching the assembled spacer 29, disc 30, O-ring 32 and seal member 33 between flat surfaces 27', 28' on respective back-up plates 27, 28. Completed assembly 23 is mounted in slot 24 of vane 20 as shown in FIG. 4 to bias seal member 33 into contact with the fluid motor walls defining chambers 21, 22 to thereby seal the chambers from one another.

Flexible seal member 33 is mechanically biased into contact with the surfaces 25, 26, 26' defining chambers 21, 22 by O-ring 32 which is squeezed or compressed radially inward when assembly 23 is mounted in vane 20. To compress O-ring 32 radially, the distance between perimeter 34 of spacer 29 and wall 35 of seal member 33 is made approximately 0.006 inch less than the diameter of the thinnest allowable O-ring 32. In the instant invention, the dimension A between opposing interior surfaces 25 in housing 19 is 1.501–1.503 inches. The radial height B of spacer 29 is 1.095–1.099 inches. The distance C between wall 35 and the outside perimeter 36 of seal member 33 is 0.110–0.116 inch. The diameter $d$ of O-ring 32 is 0.100–0.106 inch. The maximum radial height h of the space for O-ring 32 is $$h_{max} = \frac{A - B - 2C}{2} = \frac{1.503 - 1.095 - 2(.110)}{2} = .094''.$$

The minimum radial height h of the space for O-ring 32 is $$h_{min} = \frac{1.501 - 1.099 - 2(.116)}{2} = .085''.$$

Since the radial height of space for O-ring 32 ranges between 0.094–0.085 inch and O-ring 32 has a minimum diameter of 0.100 it is compressed or squeezed radially from 0.006–0.015 inch.

O-ring 32 is also compressed or squeezed laterally between back-up plates 27, 28 when assembly 23 is mounted in vane 20 as seen in FIG. 5 to prevent pressure fluid in the seal assembly from leaking to the low pressure chamber. To compress O-ring 32 laterally the distance between the inside surfaces 27', 28' of back-up plates 27, 28 is made, at least 0.006 inch less than the diameter of the thinnest allowable O-ring 32. In the instant invention, the slot width D is 0.250–0.254 inch. Back-up plates 27, 28 have a thickness E of 0.080–0.081 inch. The maximum lateral space 1 for O-ring 32 is $1_{max} = D - 2E = 0.254 - 2(0.080) = 0.094$ inch. The minimum lateral space 1 for O-ring 32 is $1_{min} = 0.250 - 2(.081) = 0.088$ inch. Since the lateral space for O-ring 32 ranges between 0.094–0.088 inch and O-ring 32 has a minimum diameter of 0.100 inch, it is compressed or squeezed laterally from 0.006–0.012 inch. In FIGS. 4 and 5, it is apparent that O-ring 32 is thicker than seal member 33 which has a thickness F of 0.082–0.088 inch and spacer 29 which has a thickness G of 0.078–0.083 inch.

The cross-sectional area and volume of an O-ring 32 may be greater than the space provided as seen from the following calculations. The cross-sectional area of the maximum space for O-ring 32 is $h_{max} \times 1_{max} = 0.00836$ in². The cross-sectional area of the minimum space for O-ring 32 is $h_{min} \times 1_{min} = 0.007744$ in². The area of O-ring 32 with a diameter of 0.100–0.106 inch ranges between 0.0078539 in².–0.0088247 in². Since the volume of O-ring 32 may exceed the volume defined by the distance between perimeter 34 on spacer 29 and wall 35 on seal member 33 and the distance between back-up plate surfaces 27', 28', shallow notches 37 or dimples are formed at intervals in the perimeter 34 of spacer 29 to provide extra space into which any excess volume of O-ring 32 may flow. Notches 37 have more volume than the excess of O-ring 32. Without notches 37, commercial tolerances in the members comprising vane seal assembly 23 prevent squeezing O-ring 32 simultaneously in two directions.

The operation of low friction vane seal assembly 23 in slot 24 of vane 20 can best be described by referring to FIGS. 4 and 5. When high pressure fluid is in fluid chamber 21, fluid flows between vane 20 and back-up plate 27 through a groove 38 in one face of back-up plate 27 into a bore 39 in plate 27. The fluid causes disc 30 to act as a check valve and move against surface 28' to cover a similar bore 40 in back-up plate 28 to prevent fluid flow up groove 41 to fluid chamber 22. The pressure fluid flows through notches 37 and spacer bore 31 to either side of spacer 29, which is thinner than seal member 33, into spaces 51 and 52 under one-half of O-ring 32 and biases it radially outwardly. Grooves 37 help transfer fluid to either side of spacer 29 to equalize pressure thereon so that spacer 29 is hydraulically balanced.

Additional high pressure fluid seeps between surface 27' and the lateral face 42 of seal member 33 into a space 53 to bias O-ring 32 laterally towards surface 28' of the other end plate 28. Consequently, high pressure fluid in spaces 51, 52 and 53 biases O-ring 32 radially and laterally towards a low pressure space 54 over a top one-fourth of O-ring 32. As viewed in FIG. 5, the left half of O-ring 32 is hydraulically balanced radially and the bottom half of O-ring 32 is balanced laterally. The radial and lateral hydraulic force on O-ring 32 is half the force which acts on conventional O-ring installations where an unbalanced hydraulic force acts on half of the O-ring. Consequently, O-ring 32 exerts a low lateral force on back-up plates 27, 28 so that it can slide over the plates when seal member 33 encounters an irregularity in the walls 25, 26, 26' and moves O-ring 32 and exerts a low radial force on seal member 33 which prevents excessive wear of member 33.

As mentioned above, spacer 29 is hydraulically balanced since pressure fluid acts on both sides of it. This reduces the frictional force on seal assembly 23 when seal member 33 must move relative to vane 20 to accommodate an irregularity in surfaces defining chambers 21, 22. In FIG. 4, it can be seen that back-up plates 27, 28 are shorter than the distance between parallel surfaces 25, 25 in housing 19. Thus, if an irregularity is encountered in surface 25, seal member 33, O-ring 32 and spacer 29 can move inward or outward while back-up plates 27, 28 remain stationary. This is desirable since fluid acting on back-up plate surfaces 27', 28' heavily loads the plates against the walls of slot 24 to prevent the plates 27, 28 from moving.

Back-up plates 27, 28 are used in the instant seal assembly 23 to support seal member 33 and O-ring 32 and to provide surfaces against which O-ring 32 can seal. Plates 27, 28 would not be necessary if vane 20 was enlarged and the walls of slot 24 extended to cover a portion of the vertical lateral face 42 of seal member 33.

It can be seen that the vane seal assembly of the instant invention provides a seal which compresses an O-ring radially and laterally to provide a seal which accommodates variations in the surfaces defining the fluid motor chambers and changes of high pressure fluid from one fluid chamber to another.

Obviously, those skilled in the art may make various changes in the details and arrangements of parts without departing from the spirit and scope of the invention as it is defined by the claims hereto appended. Applicants, therefore, wish not to be restricted to the precise construction herein disclosed.

Having thus described and shown one embodiment of the invention, what is desired to secure by Letters Patent is:

1. A fluid energy translating device comprising a housing, a member movably mounted in the housing and dividing the housing into first and second fluid-receiving chambers, fluid supply means for selectively supplying high pressure fluid to the first and second chambers, a seal assembly carried by the member to seal the first and second chambers from one another, the seal assembly having a pair of back-up plates positioned within the member and slidable with respect thereto, a spacer positioned between the back-up plates, an elastic member mounted on the perimeter of the spacer, and a seal member which engages the walls of the housing and has an opening in which the elastic member is positioned, the elastic member being mechanically squeezed radially between the spacer and seal member to bias the seal member against the housing walls and squeezed laterally between the back-up plates.

2. The fluid energy translating device recited in claim 1, wherein the spacer thickness is less than the thickness of either the seal member or the elastic member, the seal member extends beyond the back-up plates, and including second means for supplying high pressure fluid between the back-up plates to hydraulically balance the spacer and to hydraulically balance half of the elastic member in the radial direction and half of the elastic member in the lateral direction to enable the seal member, elastic member and spacer to slide as a unit relative to the back-up plates when the seal member encounters an irregularity in the housing walls.

3. The fluid energy translating device recited in claim 2, wherein the second fluid supply means includes an opening in each of the back-up plates, and a check valve for simultaneously permitting high pressure fluid to flow through an opening in one of the back-up plates and preventing high pressure fluid flow through the opening in the other back-up plate.

4. The fluid energy translating device recited in claim 3, wherein the check valve includes a disc mounted in an opening in the spacer and the disc is larger than the back-up plate bores.

5. The fluid energy translating device recited in claim 1, including notches formed in the perimeter of the spacer to provide additional space for the elastic member.

6. A fluid energy translating device comprising a housing, a member movably mounted in the housing and dividing the housing into first and second fluid-receiving chambers, fluid supply means for selectively supplying high pressure fluid to one of the first and second chambers, parallel support surfaces defining a slot in the member for receiving the seal assembly, a seal assembly mounted in the slot to seal the first and second chambers from one another, the seal assembly having a spacer, an elastic member mounted on the perimeter of the spacer and a seal member which engages the walls of the housing, the elastic member positioned in an opening in the seal member, the elastic member is mechanically squeezed radially between the spacer and seal member and laterally between the parallel support surfaces, and a notch in the perimeter of the spacer to provide additional space for the elastic member.

7. The fluid energy translating device recited in claim 6, including second means for supplying high pressure fluid between the parallel support surfaces to hydraulically balance the spacer and to hydraulically balance half of the elastic member in the radial direction and half of the elastic member in the lateral direction.

8. A fluid energy translating device comprising a housing, a member movably mounted in the housing and dividing the housing into first and second fluid-receiving chambers, fluid supply means for selectively supplying high pressure fluid to the first and second chambers, a seal assembly carried by the member to seal the first and second chambers from one another, the seal assembly having a pair of back-up plates, a spacer positioned between the back-up plates, an O-ring fitted onto the perimeter of the spacer, and a seal member positioned between the back-up plates which engages the walls of the housing, the spacer being thinner than either the seal member or the O-ring, the O-ring positioned in an opening in the seal member, the O-ring mechanically squeezed radially between the spacer and seal member to bias the seal member against the housing walls and squeezed laterally between the back-up plates, a plurality of shallow notches formed in the perimeter of the spacer to provide additional spaces for the O-ring, fluid passages in the back-up plates for conducting high pressure fluid between the back-up plates to hydraulically balance the spacer and to hydraulically balance half of the O-ring in the radial direction and half of the O-ring in the lateral direction, and valve means responsive to simultaneously open the fluid passage in one back-up plate to admit high pressure fluid between the back-up plates and close the fluid passage in the other back-up plate to prevent high pressure fluid from communicating with the chamber at low pressure.

* * * * *